(12) United States Patent
Yanchenko et al.

(10) Patent No.: US 12,718,148 B2
(45) Date of Patent: Aug. 25, 2026

(54) IDENTIFICATION OF HIERARCHICAL RECONCILIATION PROCESSES FOR PRODUCING COHERENT FORECASTS

(71) Applicant: International Business Machines Corporation, Armonk, NY (US)

(72) Inventors: Anna Yanchenko, Groton, MA (US); Wesley M. Gifford, Ridgefield, CT (US); Brian Leo Quanz, Yorktown Heights, NY (US); Nam H. Nguyen, Pleasantville, NY (US); Pavithra Harsha, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 18/089,078

(22) Filed: Dec. 27, 2022

(65) Prior Publication Data

US 2024/0211801 A1 Jun. 27, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS 7,822,240 B2 10/2010 Ayache et al.
7,945,570 B2 5/2011 Papadimitriou et al.
(Continued)

FOREIGN PATENT DOCUMENTS

CN 104766175 A 7/2015
JP H07234860 A 9/1995
(Continued)

OTHER PUBLICATIONS

Koehrsen, "Automated Machine Learning Hyperparameter Tuning in Python," Jul. 3, 2018, https://medium.com/data-science/automated-machine-learning-hyperparameter-tuning-in-python-dfda59b72f8a.*

(Continued)

*Primary Examiner* — Ryan Barrett
(74) *Attorney, Agent, or Firm* — Harrity & Harrity, LLP

(57) ABSTRACT

Mechanisms are provided for automatic identification of a reconciliation computer tool for producing coherent reconciled data from base data generated by a computer model. A machine learning training operation is executed on one or more performance prediction computer model(s) (PPCMs) based on first input features of at least one hierarchical dataset, and second input features of a plurality of different reconciliation computer tools. The PPCM(s) generate a prediction of performance of a corresponding reconciliation computer tool based on the first and second input features. Features are extracted from a runtime hierarchical dataset and input into the trained PPCM(s) which generate predictions of performance of a plurality of reconciliation computer tools based on the extracted features of the runtime hierarchical dataset. The reconciliation computer tools are ranked relative to one another based on the predictions of performance. An output is generated based on the ranking of the reconciliation computer tools.

20 Claims, 9 Drawing Sheets

(56) References Cited

U.S. PATENT DOCUMENTS

| | | | | |
|---|---|---|---|---|
| 8,326,677 | B1 | 12/2012 | Fan et al. | |
| 9,122,996 | B2 | 9/2015 | Lien et al. | |
| 9,147,218 | B2 | 9/2015 | Leonard et al. | |
| 9,244,887 | B2 | 1/2016 | Leonard et al. | |
| 11,416,867 | B2 * | 8/2022 | Lopes | G06N 3/0442 |
| 2014/0257778 | A1 | 9/2014 | Leonard et al. | |
| 2015/0154664 | A1 * | 6/2015 | Dawson | G06Q 50/16 705/306 |
| 2019/0026459 | A1 | 1/2019 | Harutyunyan et al. | |
| 2020/0082284 | A1 | 3/2020 | Moghtaderi et al. | |
| 2020/0410373 | A1 * | 12/2020 | Bin Awang Pon | G06F 16/2264 |
| 2021/0096943 | A1 * | 4/2021 | Savir | G06Q 30/0635 |
| 2021/0264375 | A1 | 8/2021 | Himura et al. | |
| 2021/0272027 | A1 * | 9/2021 | Haji Soleimani | G06Q 30/0201 |
| 2021/0350382 | A1 * | 11/2021 | Lopes | G06N 3/045 |
| 2022/0027792 | A1 * | 1/2022 | Cummings | G06N 3/045 |
| 2022/0035877 | A1 * | 2/2022 | Nittur Sridhar | G06F 16/953 |
| 2022/0035878 | A1 * | 2/2022 | Sarah | G06N 3/082 |
| 2022/0036123 | A1 * | 2/2022 | Cummings | G06F 18/285 |
| 2022/0036194 | A1 * | 2/2022 | Sundaresan | G06N 3/082 |
| 2022/0156555 | A1 | 5/2022 | Burba et al. | |
| 2022/0383145 | A1 | 12/2022 | Sen et al. | |
| 2022/0405775 | A1 | 12/2022 | Siebel et al. | |
| 2024/0078473 | A1 * | 3/2024 | Laszczuk | G06N 20/20 |
| 2024/0211835 | A1 | 6/2024 | Yanchenko et al. | |
| 2024/0242235 | A1 * | 7/2024 | Soleimani | G06Q 30/0202 |

FOREIGN PATENT DOCUMENTS

| | | | | |
|---|---|---|---|---|
| JP | 2004355200 | A | 12/2004 | |
| JP | 2018081462 | A | 5/2018 | |
| WO | WO-2019051615 | A1 * | 3/2019 | G06N 5/01 |
| WO | 2023/177308 | A1 | 9/2023 | |

OTHER PUBLICATIONS

Wu et al., "Hyperparameter Optimization for Machine Learning Models Based on Bayesian Optimization," Journal of Electronic Science and Technology vol. 17, Issue 1, Mar. 2019, pp. 26-40, https://doi.org/10.11989/JEST.1674-862X.80904120, https://www.sciencedirect.com/science/article/pii/S1674862X19300047.*

Hanzelik et al., "Data Reconciliation-Based Hierarchical Fusion of Machine Learning Models," Nov. 11, 2024, https://www.mdpi.com/2504-4990/6/4/125.*

List of IBM Patents or Patent Applications Treated as Related, Jan. 5, 2023, 2 pages.

Abolghasemi, Mahdi et al., "Model selection in reconciling hierarchical time series", Machine Learning (2022) 111:739-789, Jan. 14, 2022, 51 pages.

Hollyman, Ross et al., "Understanding forecast reconciliation", European Journal of Operational Research 294 (2021) 149-160, Jan. 14, 2021, 12 pages.

Hyndman, R.J. et al., "Forecasting hierarchical or grouped time series, Chapter 10", Forecasting: Principles and Practice (2018), May 8, 2018, 35 pages.

Spiliotis, Evangelos et al., "Improving the forecasting performance of temporal hierarchies", PLOS One, No. 10, (2019), Oct. 3, 2019, 21 pages.

Taieb, Souhaib B. et al., "Regularized Regression for Hierarchical Forecasting Without Unbiasedness Conditions", Proceedings of the 25th ACM SIGKDD International Conference on Knowledge Discovery & Data Mining (KDD '19), Aug. 4-8, 2019, pp. 1337-1347, 11 pages.

Wickramasuriya, Shanika L. et al., "Optimal Forecast Reconciliation for Hierarchical and Grouped Time Series Through Trace Minimization", Journal of the American Statistical Association 114, No. 526 (2019): 804-819, 2019, submitted version of reference dated Jun. 15, 2017, 42 pages.

Yanchenko, Anna et al., Pending U.S. Appl. No. 18/089,030, filed Dec. 27, 2022, titled "Automatic and Dynamic Adaptation of Hierarchical Reconciliation for Time Series Forecasting", 95 pages.

Hollyman et al., "Understanding forecast reconciliation", European Journal of Operational Research, Jan. 2021, pp. 149-160, vol. 294.

* cited by examiner

BOTTOM-UP

230

$$\begin{bmatrix} \tilde{Y}_T \\ \tilde{Y}_A \\ \tilde{Y}_B \\ \tilde{Y}_{AA} \\ \tilde{Y}_{AB} \\ \tilde{Y}_{AC} \\ \tilde{Y}_{BA} \\ \tilde{Y}_{BB} \end{bmatrix} = S \begin{bmatrix} 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \begin{bmatrix} \hat{Y}_T \\ \hat{Y}_A \\ \hat{Y}_B \\ \hat{Y}_{AA} \\ \hat{Y}_{AB} \\ \hat{Y}_{AC} \\ \hat{Y}_{BA} \\ \hat{Y}_{BB} \end{bmatrix}$$

*FIG. 2B*

TOP-DOWN

240

$$\begin{bmatrix} \tilde{Y}_T \\ \tilde{Y}_A \\ \tilde{Y}_B \\ \tilde{Y}_{AA} \\ \tilde{Y}_{AB} \\ \tilde{Y}_{AC} \\ \tilde{Y}_{BA} \\ \tilde{Y}_{BB} \end{bmatrix} = S \begin{bmatrix} p_1 & 0 & 0 & 0 & 0 & 0 & 0 & 0 \\ p_2 & 0 & 0 & 0 & 0 & 0 & 0 & 0 \\ p_3 & 0 & 0 & 0 & 0 & 0 & 0 & 0 \\ p_4 & 0 & 0 & 0 & 0 & 0 & 0 & 0 \\ p_5 & 0 & 0 & 0 & 0 & 0 & 0 & 0 \end{bmatrix} \begin{bmatrix} \hat{Y}_T \\ \hat{Y}_A \\ \hat{Y}_B \\ \hat{Y}_{AA} \\ \hat{Y}_{AB} \\ \hat{Y}_{AC} \\ \hat{Y}_{BA} \\ \hat{Y}_{BB} \end{bmatrix}$$

*FIG. 2C*

IDENTIFICATION OF HIERARCHICAL RECONCILIATION PROCESSES FOR PRODUCING COHERENT FORECASTS

BACKGROUND

The present application relates generally to an improved data processing apparatus and method and more specifically to an improved computing tool and improved computing tool operations/functionality for automatically identifying hierarchical reconciliation processes for producing coherent forecasts.

Computer model based forecasting is used in a number of planning and resource allocation scenarios to facilitate decision making. For example, prior to, or during, a natural disaster, a utility may use computer models to forecast damage and perform crew allocation based on predicted damage forecasts. This planning and allocation helps ensure that the necessary crews and equipment are available to expedite repair of the damage and restore service. Weather and air quality forecasting computer models can be used to help citizenry, energy companies, government organizations, and the like, to prepare for unfavorable weather conditions, predict energy usage, energy availability, and the like, e.g., issuing alerts regarding dangerous weather/air quality conditions, mobilizing crews, and the like.

Computing system and resource availability forecasting allows for system administrators, site reliability engineers, and the like, to prepare for situations within a computing infrastructure by making sure appropriate measures are taken, and resources are available, to maintain the reliability and availability of the computing systems. In still another example, an online retailer, brick-and-mortar store proprietor, and the like, may use forecasting computer models to forecast demands for products, inventory availability, and the like, to make decisions to ensure sufficient inventory to fill orders during increased sale cycles, and in some cases, move inventory between locations to accommodate predicted demand in various geographical locations.

In general, any organization, industry, government agency, or the like, that seeks to predict a future scenario or condition based on previously observed scenarios/conditions may make use of forecasting computer models to make such predictions. However, it is important, that such forecasting provide coherent and consistent forecasts across the various levels of data used to make such forecasts.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automatic identification of a reconciliation computer tool for producing coherent reconciled data from base data generated by a computer model. The method comprises executing a machine learning training operation on at least one performance prediction computer model, based on first input features of at least one hierarchical dataset, and second input features of a plurality of different reconciliation computer tools. Each of the at least one performance prediction computer models generates a prediction of performance of a corresponding reconciliation computer tool based on the first input features and second input features. The method further comprises extracting features of a runtime hierarchical dataset and inputting the extracted features of the runtime hierarchical dataset into the trained at least one performance prediction computer model. The method also comprises generating, by the at least one performance prediction computer model, predictions of performance of a plurality of reconciliation computer tools based on the extracted features of the runtime hierarchical dataset. In addition, the method comprises ranking the reconciliation computer tools relative to one another based on the predictions of performance. Furthermore, the method comprises generating an output based on the ranking of the reconciliation computer tools. The reconciliation computer tools are computing tools that reconcile data across a plurality of levels of a hierarchy of a given hierarchical dataset.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 2B and 2C demonstrate examples of a bottom-up and a top-down, respectively, reconciliation computing tool/model application of mapping matrices P;

DETAILED DESCRIPTION

Forecasting computer models many times utilize hierarchical datasets, e.g., time series datasets, to provide historical data upon which the forecasting computer model operates to generate forecast predictions. A time series dataset is a collection of data representing observations or measurements obtained through repeated measurements over time, and may be represented as a sequence of these observations/measurements with corresponding timestamps. For example, sales data may represent number of sales of one or more products at various points or ranges in time, e.g., seasons or time periods such as quarterly, monthly, etc., or even event based time periods, such as during a particular annual sale, during a promotion period, or the like. The time series datasets, e.g., sale data, may have various characteristics, such as sales price, numbers of units sold, geographic region sold, and a plethora of other data pertinent to evaluating the state of an organization, business, or the like, with regard to that product or product(s).

This time series dataset may be used with forecasting computer models to train the forecasting computer models, e.g., neural networks and other artificial intelligence computer models, to make forecasts based on patterns of input features extracted from the historical time series dataset. In this way the forecasting computer model is able to provide predictions, or forecasts, regarding future states that may serve as a basis for decision making. It should be appreciated that while the illustrative embodiments will be described with regard to a time series dataset, the illustrative embodiments are not limited to such, and instead may be applied to any hierarchical dataset, whether that hierarchy represents a physical hierarchy, a temporal hierarchy, or other logical hierarchy.

Figure 1:
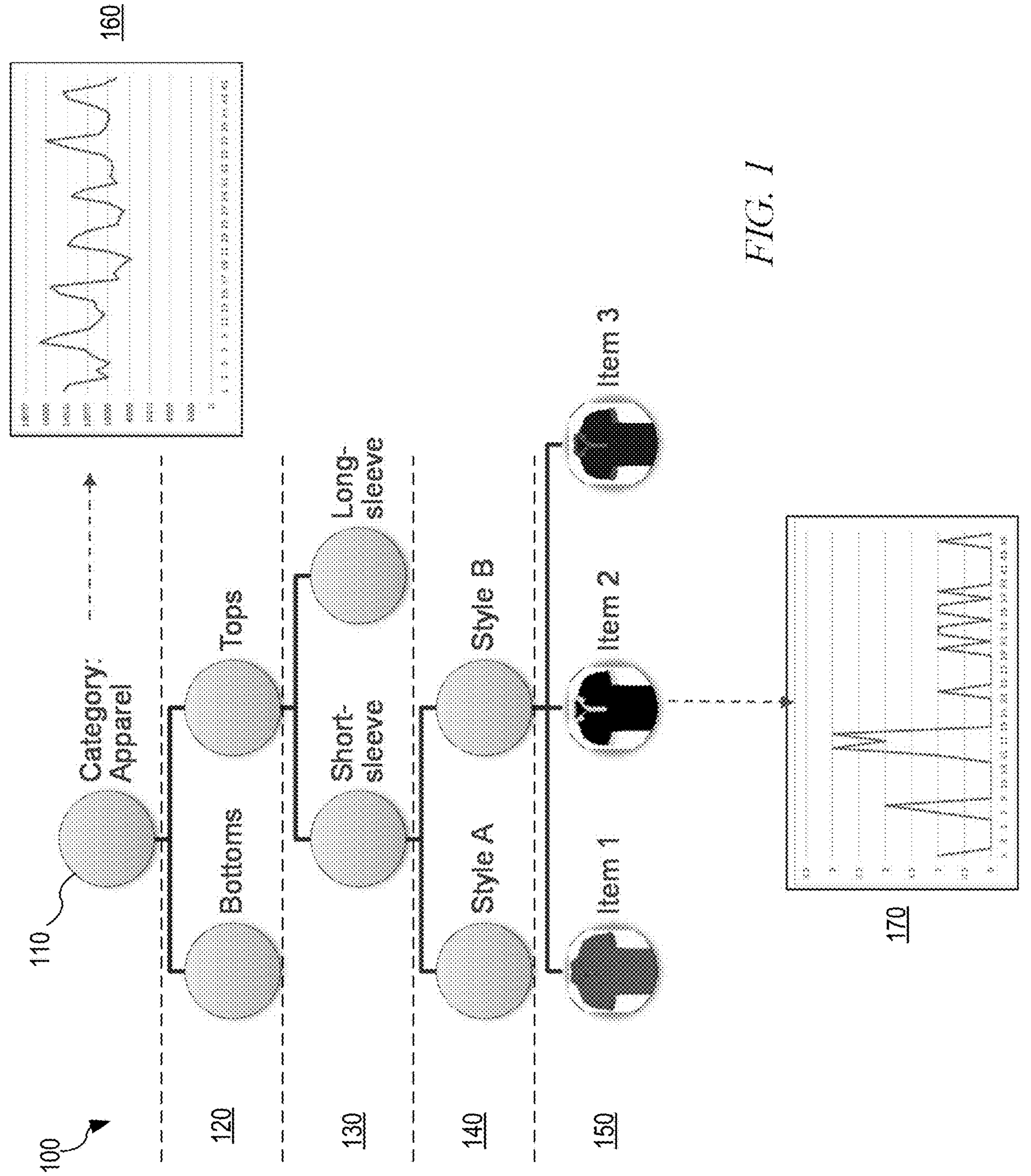
FIG. 1 is an example diagram of a product hierarchy and corresponding sales data at different levels of the hierarchy in accordance with one illustrative embodiment.

Many times, these time series datasets exhibit hierarchical structure, either cross-section, temporal, or both. For example, consider the product hierarchy example show in FIG. 1. The example of FIG. 1 shows a product hierarchy 100 in which a highest depicted level 110 is the category "apparel" which has lower levels of the hierarchy 120-140 nested in a tree-like hierarchical arrangement. That is, for example, the level 110 of "Category:Apparel" can be further categorized into "bottoms" and "tops" at lower level 120. The "tops" category of products can further be categorized into "short-sleeve" and "long-sleeve" in the lower level 130. The "short-sleeve" category may be further categorized into "Style A" and "Style B" in the lower level 140. Thereafter, the "Style B" category may be further categorized into specific products "Item 1", "Item 2", and "Item 3" in the lowest depicted level 150. Thus, time series datasets may be provided with regard to one or more of these levels and forecasting computer models need to be coherent regardless of the levels at which the time series datasets are provided. That is, the same forecasts, or at least consistent forecasts, should be made if the time series datasets provide data at level 150 as well as at level 110.

Generating forecasts at different levels of the hierarchy can provide different insights into potential future states. For example, forecasting at higher levels of the hierarchy aggregates the lower levels of the hierarchy and can be more accurate at capturing aggregate patterns and generating forecasts based on aggregate patterns. For example, the large scale trend data 160 can identify seasonality and larger aggregate patterns to better forecast patterns when the time series data is aggregated bottom-up to higher hierarchy levels. Forecasting at lower levels of the hierarchy can more accurately incorporate local effects and drive decisions, such as inventory management and the like. However, these forecasts need to be coherent in order to have coherent decision making across the various levels of the hierarchical time series datasets. For example, the sales data 170 at the lowest level 150 of the hierarchy can better represent intermittent sales data and capture localized effects to identify local trends.

Thus, generating forecasts at different levels of the hierarchy are important to decision making, and different forecasts may be generated for, and used by, different groups within an organization. The forecasts themselves may make use of different machine learning trained computer models implementing different methodologies. However, making decisions on the basis of inconsistent, and in some cases, contradictory, forecasts will introduce error into the decision making process.

Forecast reconciliation computing tools and computing models are one way in which to achieve coherent forecasts at the various hierarchical levels. Such forecast reconciliation computing tools/models leverage specialization and differing abilities of forecasts at different hierarchy levels to improve forecast accuracy. Forecast reconciliation generally adjusts forecasts made at one level of the hierarchy based on forecasts at other levels of the hierarchy. Forecast reconciliation is also referred to as top-down forecasting, bottom-up forecasting, and proportional forecasting. In top-down forecasting, the forecast is generated at the top level of the hierarchy and proportions, based on conditional forecasts given the forecast at the top-level, are used to generate forecasts at lower portions of the hierarchy. A bottom-up forecasting process generates the forecast at the bottom level of the hierarchy and aggregates the forecasts at lower levels up the hierarchy. Other middle-out forecasting is essentially a combination of top-down and bottom up forecasting in which a middle level of the hierarchy is selected for forecasting and then this forecast is aggregated up to higher levels and is proportionally propagated down the lower levels of the hierarchy.

Reconciliation is a process of mapping base forecast data to a reconciled forecast space which is consistent across all levels of the hierarchy of the input dataset. Reconciliation utilizes a mapping matrix P to map the base forecasts to this reconciled forecast space. Different reconciliation computing tools/models utilize different mapping matrices P to perform such reconciliations, where P is determined using very different functions depending on the particular reconciliation computing tools/models. The reality is that these functions and mapping matrices P work well for some time series datasets and do not work as well for others. Thus, there is a large variety of reconciliation computing tools/models and their corresponding mapping matrices P and corresponding functions for developing the mapping matrices P, which may be accurate, or inaccurate, depending on the particular time series dataset that is used as input to the forecasting computer models, and the particular forecasting computer models used.

Figure 2A:
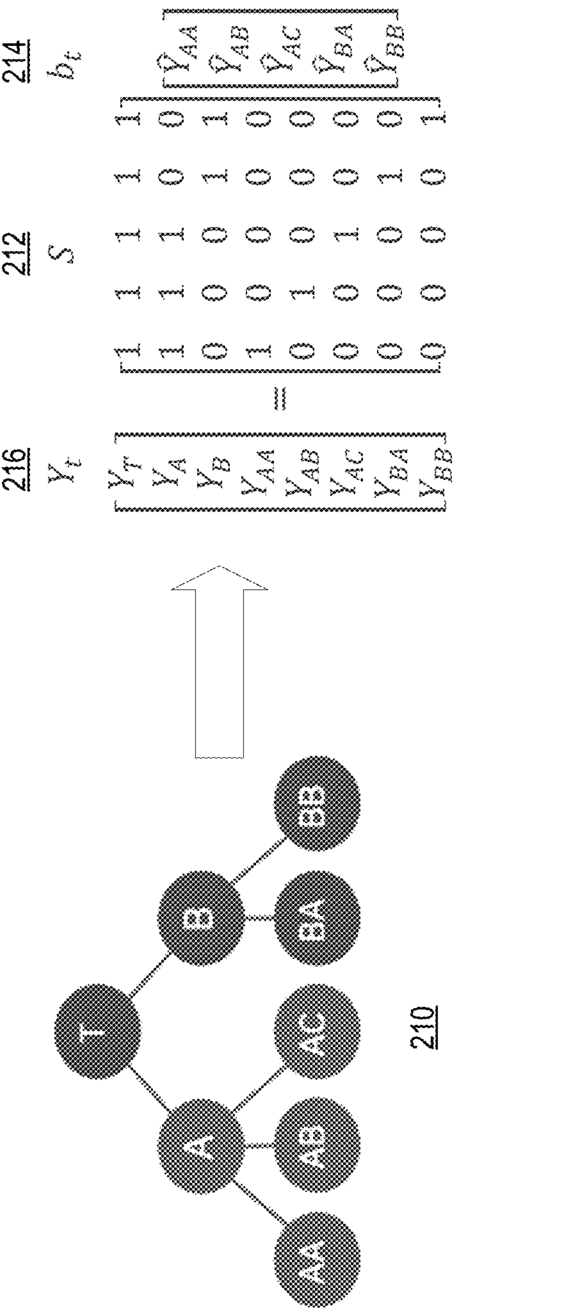
FIG. 2A is an example diagram demonstrating a base or simple reconciliation computing tool/model's mapping matrix P and a corresponding hierarchy of time series data.

FIG. 2A is an example diagram demonstrating a base or simple reconciliation computing tool/model's mapping matrix P and a corresponding hierarchy of time series data. As shown in FIG. 2A, assume that there is an input time series dataset having a hierarchy as shown in the tree data structure 210 of FIG. 2A, where each node represents a classification of the data at different levels of the hierarchy and edges represent relationships between the classifications of the data, e.g., a hierarchy of "Tops" (T)→"Short Sleeved" (A)→"Item1" (AA), "Item2" (AB), "Item3" (AC). Portions of the input dataset are associated with the nodes, where each parent node is an aggregate of its child nodes. The tree data structure 210 may be determined from the structure of the time series datasets that is input, a temporal hierarchy, or the like.

The structure of the hierarchy is captured through a summing matrix S 212, applied to $b_t$ 214 which is the lowest-level observations, e.g., $\widehat{Y_{AA}}$, $\widehat{Y_{AB}}$, etc. $Y_t$ 216 are all the observations in the hierarchy, e.g., $Y_T$, $Y_A$, $Y_B$, $Y_{AA}$, etc., where these observations are a combination of subsets of the lowest-level observations. For example, the values of S for $Y_T$ are all "1" indicating that $Y_T$ is a combination of all of the lowest-level observations. However, the values of S for $Y_B$ are 1's only for $\widehat{Y_{BA}}$ and $\widehat{Y_{BB}}$. Thus, when the summing matrix S is applied to the lowest-level observations, one gets the entire structure of the hierarchical tree data structure 210, i.e., $Y_t = S\hat{Y}_t$. When comparing the result of applying the summing matrix to base forecasts, the results may differ from forecasts made directly at higher levels. This may be due to the noisiness of the forecasts at the various levels, e.g., data tends to be more well behaved at higher levels of the hierarchy whereas at lower levels of the hierarchy, data may be more erratic, e.g., sales may be intermittent/sparse.

When performing a reconciliation of forecasts, a mapping matrix P is introduced to the evaluation, i.e., rather than $Y_t = S\hat{Y}_t$ the reconciliation involves an evaluation of $\tilde{Y}_t = SP\hat{Y}_t$, where $\hat{Y}_t$ are the base forecasts and $\tilde{Y}_t$ are the reconciled forecasts. The issue is that reconciliation computing tools/models use different formulations for specifying the mapping matrix P and have different levels of accuracy based on a large complex combination of factors which cannot be reasonably considered through manual or mental processes with any expected level of accuracy. That is, evaluating the many different features of time series datasets, the many different features of different forecasting computer models, and the many different features of reconciliation computing tools/models, and then also evaluating the various combinations of these features, is not practical as a mental or manual process.

FIGS. 2B and 2C demonstrate examples of a bottom-up and a top-down, respectively, reconciliation computing tool/model application of mapping matrices P 230, 240. The bottom-up example 230 uses an optimal linear/mint method. The top-down example 240 uses an empirical risk minimization. As is shown in FIGS. 2B and 2C, the mapping matrices P 230, 240 have different values for entries of the mapping matrices P 230, 240 which are generated using different formulations and thus, will provide different levels of accuracy depending on the particular forecast input data, which is itself dependent upon the particular forecast models, and further on the input time series datasets. The bottom-up example 230 uses a P matrix such that the reconciled forecasts will be based on only the base forecasts. On the other hand, the top down approach uses a P matrix that is structured so that each node's reconciled value is a fraction of the topmost forecast Y_T. There are other more complex methods, such as MinT and Empirical Risk Minimization.

As can be seen from FIGS. 2B and 2C, there are many different reconciliation computing tools/models with different formulations that provide different levels of accuracy. Knowing which reconciliation computing tool/model will generate the most accurate reconciliation of forecast data is something that, in general, cannot be performed a priori. As a result, users utilize a plurality of different tools/models and use brute-force exhaustive searches for a best tool/model. This is a very time consuming and resource consuming process. In some cases, because of this time consuming and resource consuming brute force method, some users choose not to pursue such exploration of alternatives and instead simply select one tool/model which may not be the most effective and provide the most accurate forecasts for the time series datasets that they utilize.

Figure 3:
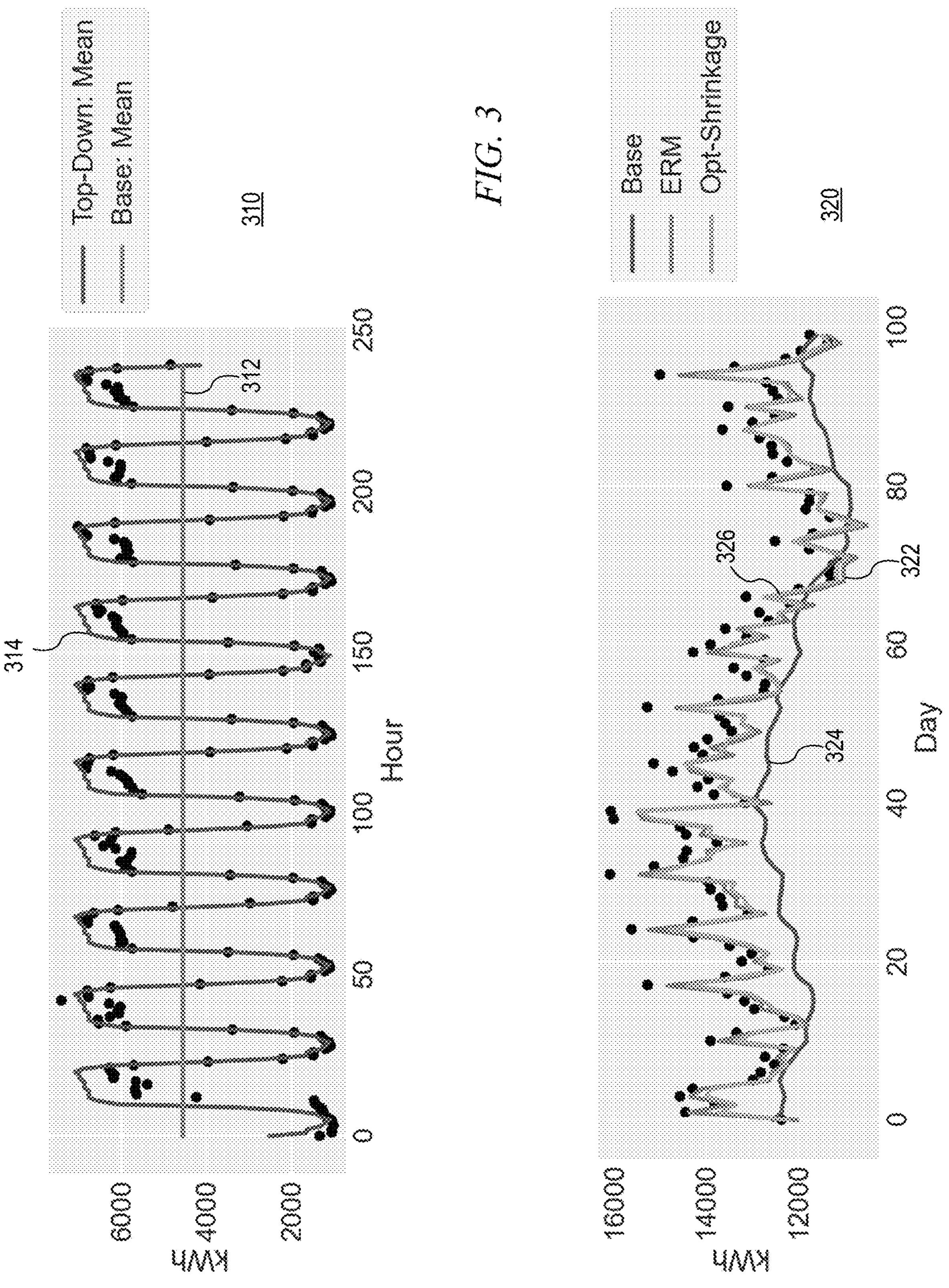
FIG. 3 is an example diagram demonstrating the accuracy of different reconciliation computing tools/models.

For example, FIG. 3 demonstrates the accuracy of different reconciliation computing tools/models. In the graphs 310 and 320 of FIG. 3, the dots represent actual data points and the base line 312, 322 represents a base forecast. The lines 314 and 324, 326 represent different more complex reconciliation computing tools or models. The graph 310 demonstrates that reconciliation brings improvements to inaccurate base model forecast 312 with varying degrees of accuracy and improvement. For example, lines 312, 314 closely match each other and fit well to the true data points. The graph 320, however, demonstrates that the base forecasts have very poor accuracy to some time series datasets and are significantly less accurate than more complex reconciliation computing tools/models. Thus, in this case, it would be a poor choice to use base forecasts and instead, a more complex reconciliation computing tool/model should be utilized. However, it is not known, a priori, which reconciliation computing tools/models work well with which time series datasets and forecasting computing models. As a result, one either selects a reconciliation computing tool/model and accepts the inaccuracy of the selected reconciliation computing tool/model in some situations, or one must use the brute force method described above and use many different reconciliation computing tools/models (which is a very time consuming and resource intensive process) and determine after the fact which reconciliation computing tool/model provided the most accurate result.

Contrary to this brute force method, the illustrative embodiments provide an artificial intelligence (AI) based solution that involves a machine learning training of a machine learning computer model, e.g., neural network, deep neural network, random forest, support vector machine, a light gradient boosting machine (LightGBM), or the like, to thereby cause the computer model to learn from historical data and prior reconciliation performance, to predict the performance of particular reconciliation computer tool/model performance for given reconciliation tools/models. That is, given a set of input dataset features, forecast computer model features, and reconciliation computing tool/model features, the trained machine learning computer model predicts the performance of the set of reconciliation computing tools/models. From this prediction of performance, the reconciliation computing tools/models may be ranked relative to one another, e.g., highest to lowest performance, and one or more of the highest ranked reconciliation computing tools/models may be selected for use in performing reconciliation of forecasts for a given combination of time series dataset and forecast computer model features. The ranking and selection may be used to generate an output, such as a dashboard or the like for presentation to an authorized user, may be used to automatically select a reconciliation computing tool/model that is applied to the forecast data generated by the forecast computer model based on the input time series dataset, or the like. In the case of a dashboard, various views of the data used to generate the ranking of reconciliation computing tools/models as well as the basis for the rankings may be provided in the dashboard.

A key observation is that it is simpler and more efficient, in terms of time and resource costs, to compute features of a dataset and evaluate them through a trained machine learning computer model than it is to try all of the possible reconciliation computing tools and select the best performing one. Thus, in these illustrative embodiments, mechanisms are provided that implement a feature driven approach to reconciliation tool/model selection that captures the properties of the underlying time series dataset as well as the characteristics of the forecast computing model and the reconciliation computing tools/models. In other illustrative embodiments, a representation learning based implementation may be utilized. In the representation learning illustrative embodiments, instead of extracting specific features from the time series dataset, a representation computer model is learned for representing the features of the time series dataset. That is, the representation computer model represents the features as a vector representation rather than explicitly extracting specific features from the time series dataset such that aspects of the data that are not directly captured by the individual features themselves may be captured in the vector representation. This representation is provided as input that represents the features of the time series dataset along with the reconciliation computing tool/model features and forecast computing model features, and a similar process of predicting performance of the forecast computing model may be performed by the trained machine learning computer model of the illustrative embodiments.

Once the machine learning computer model of the illustrative embodiments is trained on historical data, the trained machine learning computer model may be applied to new data to predict the performance of reconciliation computing tools/models and thereby identify which reconciliation computing tools/models should be applied to perform reconciliation of forecast data. That is, a user may specify a particular hierarchy of an underlying time series dataset, such as by providing a hierarchical tree data structure, applying an analysis tool that generates such a hierarchical tree data structure, or otherwise specifying the hierarchy, such as by specifying a summing matrix data structure or the like. The time series dataset is processed by a forecast computer model to generate forecast data for the hierarchical time series dataset. Moreover, a time series dataset feature extractor analyzes and extracts specific features of the time series dataset, including, for example, a seasonality of the time series dataset, domain and metadata features, noise across the hierarchy of the time series dataset, noise across time, trend/stationarity of the data in the time series dataset, and other hierarchy characteristics. For example, seasonality refers to the length of a seasonal period, e.g., as determined by looking at a frequency spectrum for the data, where the seasonality may be represented as a seasonal pattern vector, such as a vector of length 4 for quarterly average values, or vector of length 7 for day or week patterns. The trend/stationarity information indicates whether a trend exists or not (i.e., a trend indicator) and may report the result of a test statistic for a stationarity test, e.g., augmented Dickey Fuller test.

The domain and metadata may include a periodicity, i.e., a unit of time data is captured at, e.g., daily or weekly for retail demand data, minute or hourly for energy demand data, second or minute for manufacturing/production processes, or the like. The domain may specify the particular type or category of activity represented in the data, e.g., retail, manufacturing, energy, or the like. The noise characterizes changes in noise level across time (heteroskedasticity) and characterizes the noise in each level of the hierarchy as well as across levels of the hierarchy, which can be determined via examining fluctuations around a mean value for a particular point in the hierarchy. Hierarchy characteristic refers to the number of levels in the hierarchy, number of nodes in each level, and other such features representing the structure of the hierarchy itself. Each of these features can be extracted through queries on the data or through application of implementation specific formulas.

In addition, characteristics of the forecast computer models may also be provided, where these characteristics may include the forecast computer model, base forecast error properties, and base forecast properties, where these characteristics may be encoded as on-hot vectors. In some illustrative embodiments, a catalog of forecast computer models may be maintained and stored for retrieval when a user specifies the particular forecast computer model being utilized with the time series dataset.

Moreover, a catalog of reconciliation computing tools/models may be maintained and utilized to retrieve reconciliation computing tool/model features, such as the encoding method used, additional parameter encoding features, and the like. These features will be input along with the features of the forecast computing model and time series dataset features to predict performance of the reconciliation computing tools/models in the catalog and rank them relative to one another. The illustrative embodiments may automatically select a reconciliation computing tool/model from the catalog for use with the time series dataset and forecast computing model to thereby automatically generate a reconciled forecast dataset. In some cases, the illustrative embodiments may generate a recommendation output, such as via a dashboard or the like, that outputs the results of the prediction of performance and ranking of reconciliation computing tools/models.

In some illustrative embodiments, from the operation of the illustrative embodiments, a set of rules may be generated that correlates time series dataset features with reconciliation computing tools/models that provide the highest ranking performance. This set of rules may be provided as an output for execution to select a reconciliation computer tool/model based on an analysis of time series dataset features. For example, a set of rules may include a first rule that states "If time series demonstrates consistent seasonality, and forecast quality is good, select a top-down reconciliation computing tool/model" and a rule that specifies "If higher levels in the hierarchy are noisy, select a bottom-up reconciliation computing tool/model", and further a rule that specifies "if the time series dataset demonstrates non-stationarity, then select a dynamic reconciliation computing tool/model". These rules may be automatically generated based on a correlation of reconciliation computing tool/model performance predictions to time series dataset features. There may be a separate set of rules for each forecast computer model. Thus, when these rules are deployed, all one need do is run an analysis of the time series dataset to extract the time series dataset's features and then execute the set of rules on these features to identify a reconciliation computing tool/model to use with the forecast data generated by the forecast computer model to thereby generate reconciled forecast data.

Thus, the mechanisms of the illustrative embodiments are able to predict the performance of reconciliation computing tools/models so that informed decisions can be made regarding which reconciliation computing tools/models to utilize to reconcile forecasts generated for hierarchical datasets, such as time series datasets or the like. The "performance" of a reconciliation computing tool/model may be, for example, a measure of the accuracy of the reconciled forecast data relative to the actual data at each level of the hierarchy. The performance may be measured using various accuracy metrics, such as mean squared error, mean absolute error, symmetric mean absolute percentage error, or the like. In order to determine the performance, forecasts are produced using the underlying forecast models, the reconciliation approach is applied, and the reconciled forecasts and ground truth, e.g., actual data, are used to compute the performance metric.

The reconciliation computing tools/models may vary in complexity as well as corresponding resource costs, e.g., processor and/or memory resource requirements and computation time. As noted above, in some cases less complex, and thus less resource costly, reconciliation computing tools/models may be able to provide sufficiently similar performance to more complex reconciliation computing tools/models. With the mechanisms of the illustrative embodiments, these situations may be identified automatically using the ranking generated by the illustrative embodiments so that in such cases, the less complex reconciliation computing tools may be selected, i.e., when a simpler method provides comparable performance, or even outperforms, a more sophisticated method, then the simpler method may be selected. Moreover, this ranking can identify situations where a more complex reconciliation computing tool/model is needed to provide sufficient performance. This evaluation may be codified into automatic selection of a reconciliation computing tool/model, automatic generation of a set of reconciliation computing tool/model selection rules for a forecast computer model, or output to an authorized user that performs the selection based on the relative ranking of reconciliation computing tools/models.

The illustrative embodiments avoid having to perform an exhaustive search of reconciliation computing tools/models by implementing all of the reconciliation computing tools/models on the forecasts and then evaluating the results after the fact. Moreover, the illustrative embodiments avoid merely selecting a reconciliation computing tool/model and using the same selection for all input time series datasets and forecast computing models. To the contrary, the illustrative embodiments adapt the predictions of performance to the particular features of the time series dataset, the forecast computing models, and the reconciliation computing tools/models being evaluated, such that the most likely highest performing reconciliation computing tools/models may be identified ahead of time, selected, and applied, thereby reducing resource expenditures, reliance on inaccurate reconciled forecast data, and maximizing accuracy of the reconciled forecast data.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As described above, the illustrative embodiments of the present invention are specifically directed to an improved computing tool that automatically identify hierarchical reconciliation processes for producing coherent forecasts. In particular, the illustrative embodiments provide an artificial intelligence (AI) based computing tool that automatically predicts the performance of reconciliation computing tools/models on particular time series datasets and forecast computing models so as to relatively rank them to one another and, in some cases, generate recommendation outputs, automatically execute a selected reconciliation computing tool/model, and/or generate a set of reconciliation computing tool/model selection rules that may be executed on features of time series datasets to select a reconciliation computing tool/model to utilize with forecast data generated by a forecast computing model. All of the functions of the illustrative embodiments as described herein are intended to be performed using automated processes without human intervention. While a human being may initiate operation of the illustrative embodiments and/or provide some of the input data used by the mechanisms of the illustrative embodiments, the illustrative embodiments of the present invention are not directed to actions performed by the human being but rather logic and functions performed specifically by the improved computing tool based on the machine learning training of the machine learning computer model and/or automated rule generation engine. Moreover, even though the present invention may provide an output that ultimately assists human beings with regard to making decisions based on forecasts, the illustrative embodiments of the present invention are not directed to actions performed by the human being viewing the results of the processing performed by the illustrative embodiments, but rather to the specific operations performed by the specific improved computing tool of the present invention. Thus, the illustrative embodiments are not organizing any human activity, but are in fact directed to the automated logic and functionality of an improved computing tool.

Figure 4:
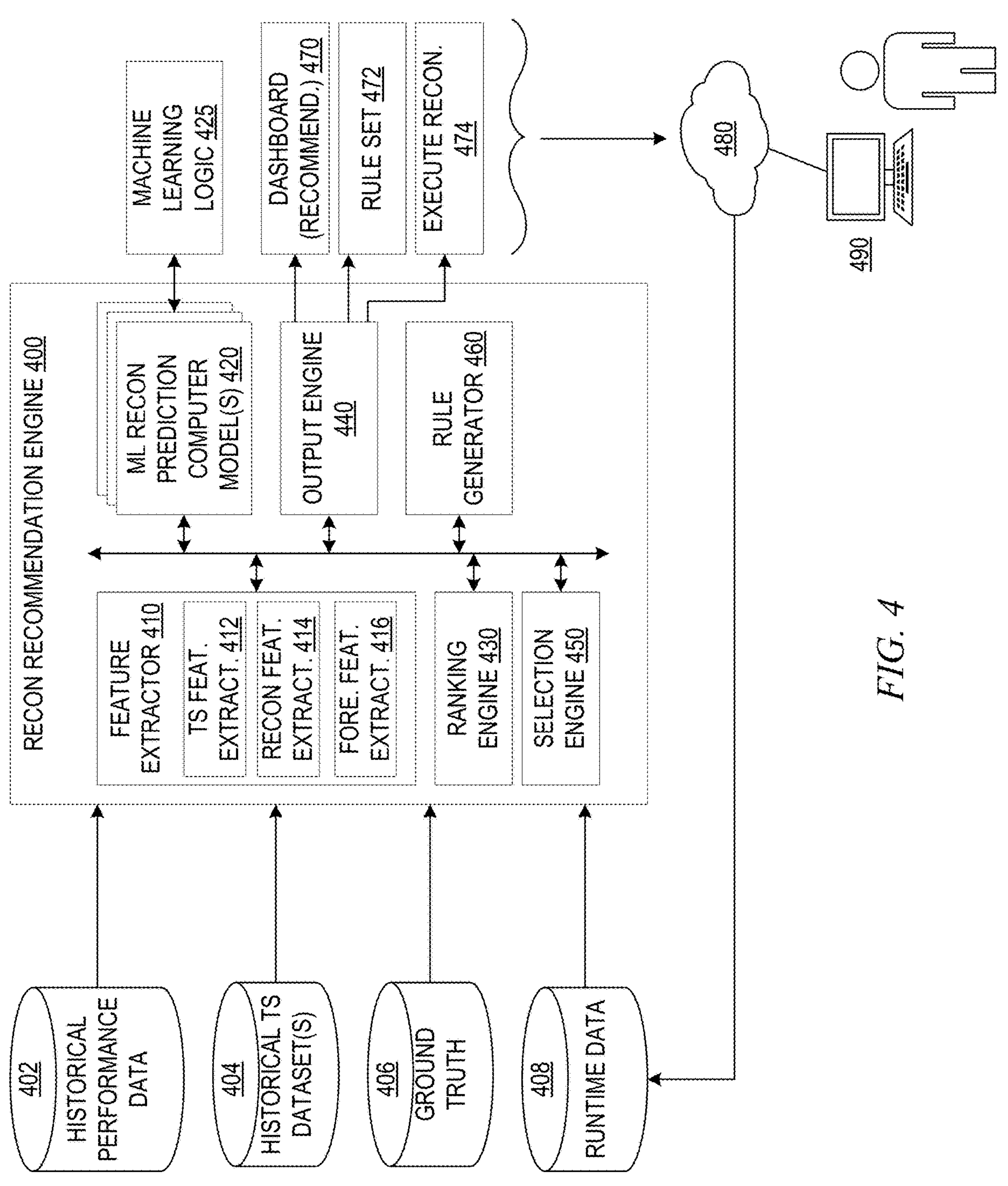
FIG. 4 is an example block diagram of the primary operational components of a reconciliation computing tool/model recommendation engine in accordance with some illustrative embodiments.

FIG. 4 is an example block diagram of the primary operational components of a reconciliation computing tool/model recommendation engine in accordance with some illustrative embodiments. It should be appreciated that the various elements shown in FIG. 4 are specifically implemented by specialized computing logic and/or data structures that specifically configure one or more data processing systems to provide the specialized computer functionality described herein. While FIG. 4 shows the primary operational components, it should be appreciated that additional components will be present as well, such as operating systems, libraries, application programming interfaces, storage controllers, and other software and/or hardware elements that facilitate the specialized functionality described herein.

As shown in FIG. 4, the reconciliation computing tool/model recommendation engine 400 (hereafter, recon recommendation engine 400) includes a feature extractor 410, a machine learning (ML) trained reconciliation computing tool performance prediction computer model 420 (hereafter, recon prediction model 420), a reconciliation computing tool ranking engine 430 (hereafter, recon ranking engine 430), an output engine 440, and in some illustrative embodiments a reconciliation computing tool selection engine 450 (hereafter, recon selection engine 450) and/or a rule generator 460. The recon recommendation engine 400 may operate on various data structures 402-408 during machine learning training of the recon prediction model 420 and/or during runtime operation after the recon prediction model 420 has been trained through machine learning processes. These data structures may include historical performance data 402, historical time series data 404, ground truth data 406, and runtime data 408, each of which will be described in greater detail hereafter. Moreover, the components 410-460 of the recon recommendation engine 400 may further have sub-components for performing their functionality, e.g., feature extractor 410 may have a time series (TS) feature extractor 412 that extracts features of a time series dataset, a reconciliation computer tool/model feature extractor 414 that extracts features of a plurality of reconciliation computer tools/models, and a forecast computer model feature extractor 416 that extracts features of a given forecast computer model.

Other components and functionality that supports the functionality of the depicted components will be readily apparent to those of ordinary skill in the art in view of the present description. For example, machine learning methodology logic 425 may be provided for performing the machine learning training of the recon prediction computer model 420, where this machine learning methodology may include supervised or unsupervised machine learning. For example, a machine learning based on a loss formula and a linear regression, e.g., using stochastic gradient descent or the like, based evaluations may be utilized to minimize the loss by modifying operational parameters of the recon prediction computer model 420 to reduce error in the predictions generated until a satisfactory level of error is achieved or a predetermined number of machine learning training epochs, or iterations, have been performed. The particular loss function utilized and the particular logic for updating operational parameters of the model 420 will be implementation dependent and may take many different forms based on the desired implementation.

In general, the recon recommendation engine 400 learns a meta model that captures the relationship between properties, or features, of the underlying time series (TS) dataset, forecast computer model, and reconciliation computing tools/models, to the performance of the reconciliation computing tools/models. During a machine learning training operation, the machine learning training is performed based on historical data 402-404 and a ground truth data set 406. During runtime operation, the operations are based on runtime data 408 which have similar components to historical data 402-404, but are new datasets and not labeled training data corresponding to ground truth data 408. The following will first describe a machine learning training of the recon prediction model 420 followed by a discussion of the runtime operation.

During a machine learning training operation, the feature extractor 410 extracts features of the historical time series dataset 404 as well as features of a forecast computer model and reconciliation computing tools/models as specified in the ground truth dataset 406. For example, the ground truth dataset 406 may include data specifying characteristics of a forecast computer model that is being used to generate forecast data based on the input time series dataset, e.g., historical time series dataset 404. The ground truth dataset 406 may also include a reconciliation computing tool/model catalog 407 specifying characteristics of reconciliation computing tools/models that may be utilized to perform reconciliation of forecast data generated by the forecast computer model. The feature extractor 412 may operate on the historical time series data 404 and extract features of that historical time series data 404, the feature extractor 414 may operate on the reconciliation computer tool/model catalog data 407 of the ground truth data 406 to extract features for each of the reconciliation computer tools/models, and the feature extractor 416 may operate on the forecast computer model characteristics to extract features of the forecast computer model.

For example, the feature extractor 412 may extract time series dataset features, such as seasonality features, domain/metadata features, noise across hierarchy features, noise across time features, trend/stationarity features, and hierarchy characteristics features, for example. The feature extractor 414 may extract reconciliation computing tool/model features such as the tool/model encoding method used and additional parameter encoding method. The feature extractor 416 may extract forecast computing model features such as the forecasting approach used, the base forecast error properties, and base forecast properties, for example.

These features may be encoded, such as by generating vector representations of these features, e.g., one-hot vector encoding, that are input to the recon prediction computer model 420. The recon prediction computer model 420 may operate on the encoded features for the time series dataset 404, the forecast computing model, and a reconciliation computing tool/model from the catalog 407. The recon prediction computer model 420 generates a prediction of the performance of the reconciliation computing tool/model. This predicted performance may then be compared to the historical performance data 402 for this time series dataset, forecast computing model, and reconciliation computing tool/model to determine a loss between the prediction and the actual historical data. This loss may be calculated using a predetermined loss function and the ML logic 425 may operate to determine a modification to operational parameters of the recon prediction computer model 420 to reduce this loss, or error, such as by using linear regression and stochastic gradient descent or any other suitable machine learning methodology.

This process may be performed over multiple epochs or iterations using the same or different time series datasets from the historical time series data 404 to thereby adjust or modify the operational parameters of the recon prediction computer model 420 until a satisfactory loss (error) is achieved, e.g., loss/error below a predetermined threshold value, or until a predetermined number of epochs are executed, i.e., convergence of the recon prediction computer model 420. It should be appreciated that while FIG. 4 shows a single recon prediction computer model 420, there may in fact be multiple different recon prediction computer models 420 that are each individually trained through a machine learning training process. For example, in some illustrative embodiments, a separate recon prediction computer model 420 may be provided and trained for each forecast computer model. In this way, different recon prediction computer models 420 may be trained to predict performance of reconciliation computer tools/models for different forecast computer models. Thus, one or more recon prediction computer models 420 are trained through machine learning training processes of the ML logic 425 that provide accurate predictions of performance of reconciliation computer tools/models for different combinations of features of different types of time series datasets and forecast computer models.

During runtime operation, rather than using the labeled historical data 402, 404 and the ground truth data structures 406, 407, the recon recommendation engine 400 operates on runtime data 408. The runtime data 408 may include the specific time series dataset, or extracted features of the time series dataset, and a specification of the particular forecast computer model being used by the particular end user computing system 490. This information may be received from the end user computing system 490 via one or more wired/wireless data networks 480, with the operation of the recon recommendation engine 400 being provided as a service to the end user. In some cases, this information may further include a specification of a plurality of reconciliation computing tools/models that are to be evaluated for possible use with the time series dataset and forecast computer model specified in the runtime data 408. For example, in some cases, the user may log onto an interface provided by the recon recommendation engine 400 through which the end user may specify, upload, or otherwise provide the runtime data 408.

The runtime data 408 may be processed via the feature extractor 410 which extracts features from the runtime data 408, similar to during the machine learning training discussed above, and these features, or encodings of these features, are input to the trained recon prediction computer model(s) 420. In some illustrative embodiments, if there are multiple recon prediction computer models 420, one corresponding to the specified forecast computer model may be selected and utilized to generate a prediction of performance of the reconciliation computer tools/models, e.g., either all of them or the particular subset specified in the runtime data 408. This may require multiple executions of the recon prediction computer model 420 for different combinations of the time series dataset features and reconciliation computer tool/model features to thereby generate a separate prediction of performance for each reconciliation computer tool/model given the time series dataset features and the forecast computer model features.

The predicted performance may be used to rank the reconciliation computer tools/models relative to one another for the given time series dataset and forecast computer model. The ranking engine 430 may utilize these predicted performance measures to rank the reconciliation computer tools/models relative to one another, but may, in some illustrative embodiments, utilize additional factors to perform the relative ranking. For example, in addition to the predicted performance, the ranking engine 430 may also utilize factors such as computing resource requirements for the various reconciliation computer tools/models, storage requirements, and the like. In some illustrative embodiments, a weighted combination of these features may be utilized to determine a final ranking score for each reconciliation computing tool/model which is then used to generate a final relative ranking, e.g., from highest ranking to lowest ranking scores.

The recon selection engine 450 may operate based on the relative ranking generated by the ranking engine 430 to select one or more reconciliation computer tools/models for recommending to the end user. For example, in some cases, a top-k selection process may be specified for selecting the top-k ranked reconciliation computer tools/models for use with the time series dataset and forecast computer model specified in the runtime data 408. In other implementations, different selection criteria may be used to select from the ranking of reconciliation computer tools/models, e.g., using a ranking which balances anticipated performance, e.g., represented by MSE, MAE, or other metrics, as well as computational complexity, e.g., bottom-up reconciliation being simpler than MinT.

The results generated by the ranking engine 430 and the selection engine 450 may be used by the output engine 440 to generate a dashboard 470 output or other output interface that informs the end user of the recommended reconciliation computer tool(s)/model(s) for the time series dataset and forecast computer model. This dashboard 470 may specify the recommendation, the relative ranking, the reasoning for the relative ranking, e.g., ranking scores and weighted factors for the various components of the ranking scores, predicted performance, etc.

In some illustrative embodiments, the results generated by the selection engine 450 may be used to automatically initiate execution 474 of a selected reconciliation computer tool/model on the forecast data generated by the specified forecast computer model in the runtime data 408. That is, once it is determined by the mechanisms of the illustrative embodiments which reconciliation computer tool/model provides the relatively best predicted performance, that tool/model may be automatically applied to the base forecast data. For example, the particular mapping matrix P and corresponding formulation for generating the values of the mapping matrix P may be applied to the base forecasts $\hat{Y}_t$ to generate the reconciled forecasts $\tilde{Y}_t$ in the relation $\tilde{Y}_t=SP\hat{Y}_t$ given the hierarchical structure S of the time series dataset. This may be accomplished by providing the reconciliation computer tool/model to the end user computing system 490 via the data network(s) 480 if the end user computing system 490 does not already have the reconciliation computer tool/model available locally, and causing the end user computing system 490 to execute the reconciliation computer tool/model locally. Alternatively, the service provided in which the engine 400 is a part may execute the reconciliation computer tool/model as part of the service on the time series dataset provided as part of the runtime data 408 and provide the reconciled forecast data to the end user computing system 490.

In some illustrative embodiments, the results of the trained prediction computer model 420 operation on input features may be used to correlate input features with predicted performance and rankings of reconciliation computing tools/models. That is, as stated previously, correlations may be used to automatically generate computer executable rule sets 472 for the various forecast computer models. These rule sets 472 correlate input features, e.g., features of time series datasets, features of forecast computer models, and which reconciliation computer tools/models to utilize, which may be based on the rankings and selections performed by the ranking engine 430 and selection engine 450. The rules of the rules set 472 may be specified in different forms, but in one illustrative embodiment, the rule generator 460 analyzes and correlates the input features with performance predictions and rankings/selections to generate tuple data structures in which a portion of the tuple data structure specifies criteria of the rule and another portion of the tuple data structure specifies a reconciliation computer tool/model to select if the criteria are satisfied. These rules may be a nested set of rules 472 where branches of rules are followed until a selection of a reconciliation computer tool/model is reached.

For example, a tuple may be of the type [seasonality, forecast quality, higher level noise, stationarity, reconciliation tool/model or dependent rule reference]. Values may be set for these various tuple elements to specify the rule, e.g., [1, 0.70, 0.25, 0, recon2] meaning that if the seasonality is "seasonal" (1), the forecast quality is at least 70 percent, the higher level noise is 25 percent or less, the time series dataset does not show stationarity (0), then reconciliation computer tool "2" is selected, e.g., bottom-up reconciliation computer tool. The reconciliation tool/model or dependent rule reference either has a value that points to a dependent rule to then execute if the criteria are satisfied, or references a specific reconciliation computer tool/model to use to perform reconciliation of forecast data. A rule execution engine may be deployed at the end user computing system 490 or otherwise executed by the service to implement the set of rules. This is just one example, and any other way of specifying rules may be utilized without departing from the spirit and scope of the present invention.

The set of rules are associated with a specific forecast computer model and thus, by specifying the particular forecast computer model, the corresponding set of rules may be automatically retrieved. Moreover, the rules need only be applied to features extracted from the time series dataset, e.g., the hierarchy, the various characteristics of the data extracted by the feature extractor, and the like. For example, the feature extractor extracts features regarding seasonality, forecast quality, higher level noise, and stationarity and these values are compared to corresponding criteria specified in the rule tuple data structures to determine which rules have criteria that have been satisfied. Thus, rather than having to execute the ML trained reconciliation prediction computer model(s) 420 for each new runtime dataset 408, the features of the runtime dataset 408 need only be extracted and the rules applied by the rule execution engine to select a corresponding reconciliation computer tool/model. It should be appreciated that the rule generator 460, rule execution engine, and the like, need not be included in every illustrative embodiment and in some illustrative embodiments, the selection is made by executing the ML trained reconciliation prediction computer model(s) 420 on each new runtime dataset 408 with subsequent ranking and selection by the ranking engine 430 and selection engine 450.

Thus, the mechanisms provide an automated computing tool for predicting the performance of reconciliation computer tools/models with regard to features of a hierarchical dataset, e.g., a time series dataset, and a forecast computer model which operates on the hierarchical dataset. The mechanisms provide one or more specifically trained machine learning trained computer models to make such predictions which take into account the features of the time series dataset, the features of the forecast computer model, and the features of the reconciliation computer tools/models to determine the predicted performance. Based on the predicted performance, the candidate reconciliation computer tools/models may be ranked relative to one another and a selection of a candidate reconciliation computer tool/model to use to perform reconciliation of forecast data is made. This recommendation and corresponding supporting data may be presented through a dashboard interface, may be used for automatic execution of the selected reconciliation computer tool/model, and the like. In some cases, the performance predictions, rankings, and selections may be used along with the input features to automatically generate rule sets for forecast computer models to correlate features of a time series dataset with a selection of a reconciliation computer tool/model to use with the forecast data of the forecast computer model to generate reconciled forecast data.

Figure 5:
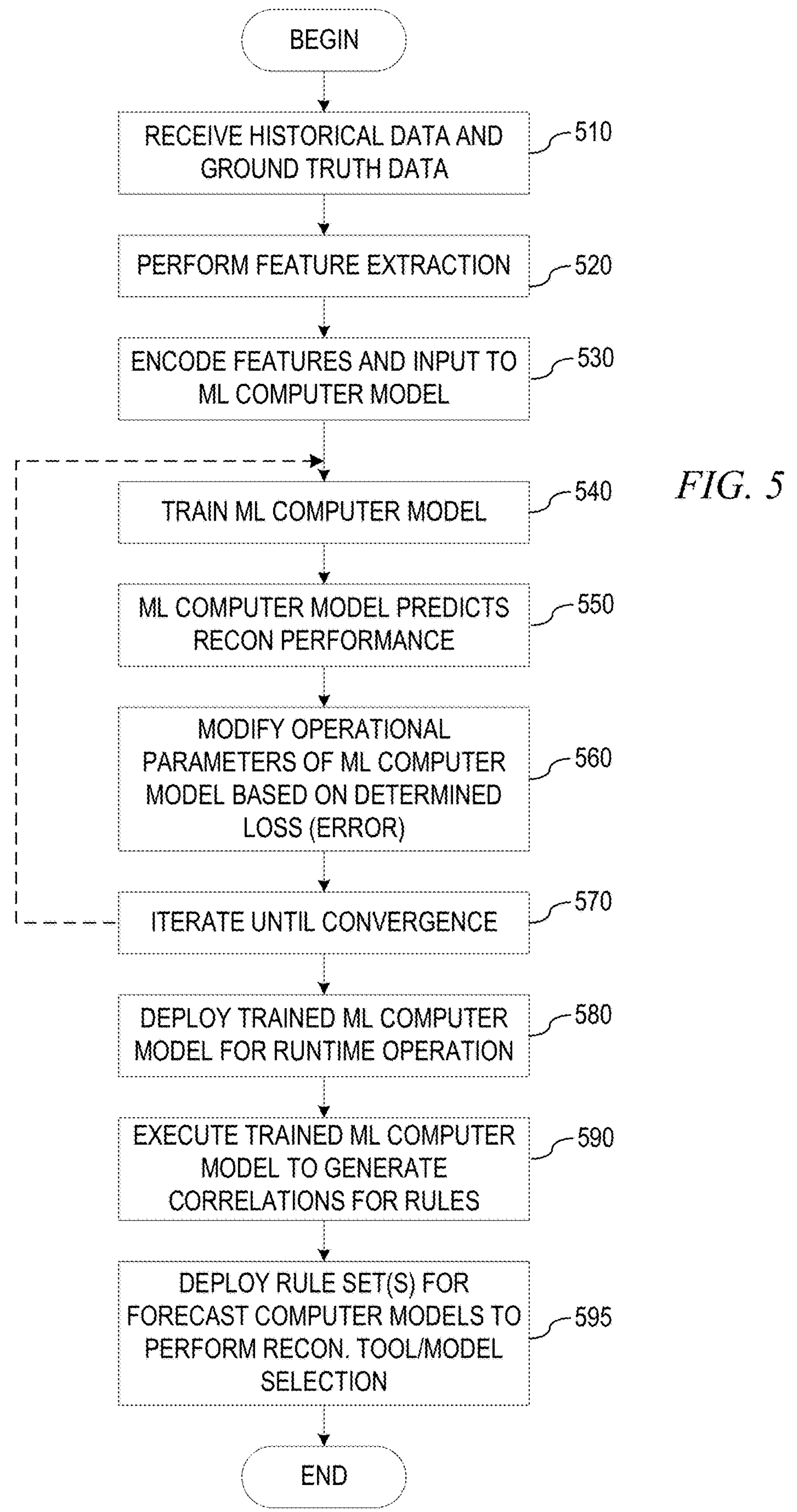
FIG. 5 is a flowchart outlining an example operation for training a machine learning computer model for reconciliation computing tool selection in accordance with some illustrative embodiments.
Figure 6:
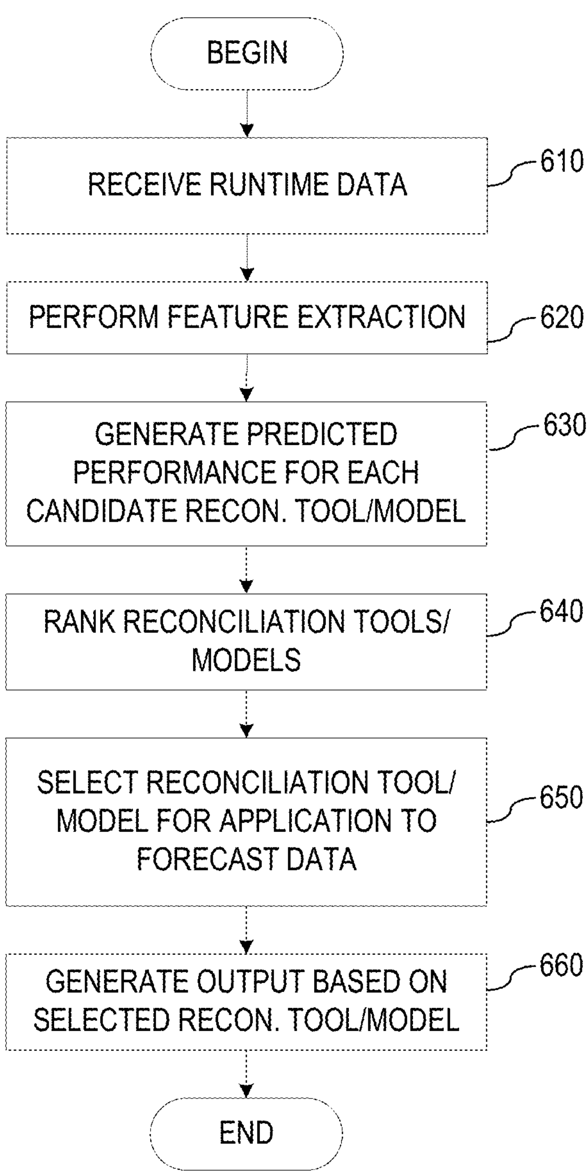
FIG. 6 is a flowchart outlining an example operation for performing reconciliation computing tool selection and execution in accordance with some illustrative embodiments.
Figure 7:
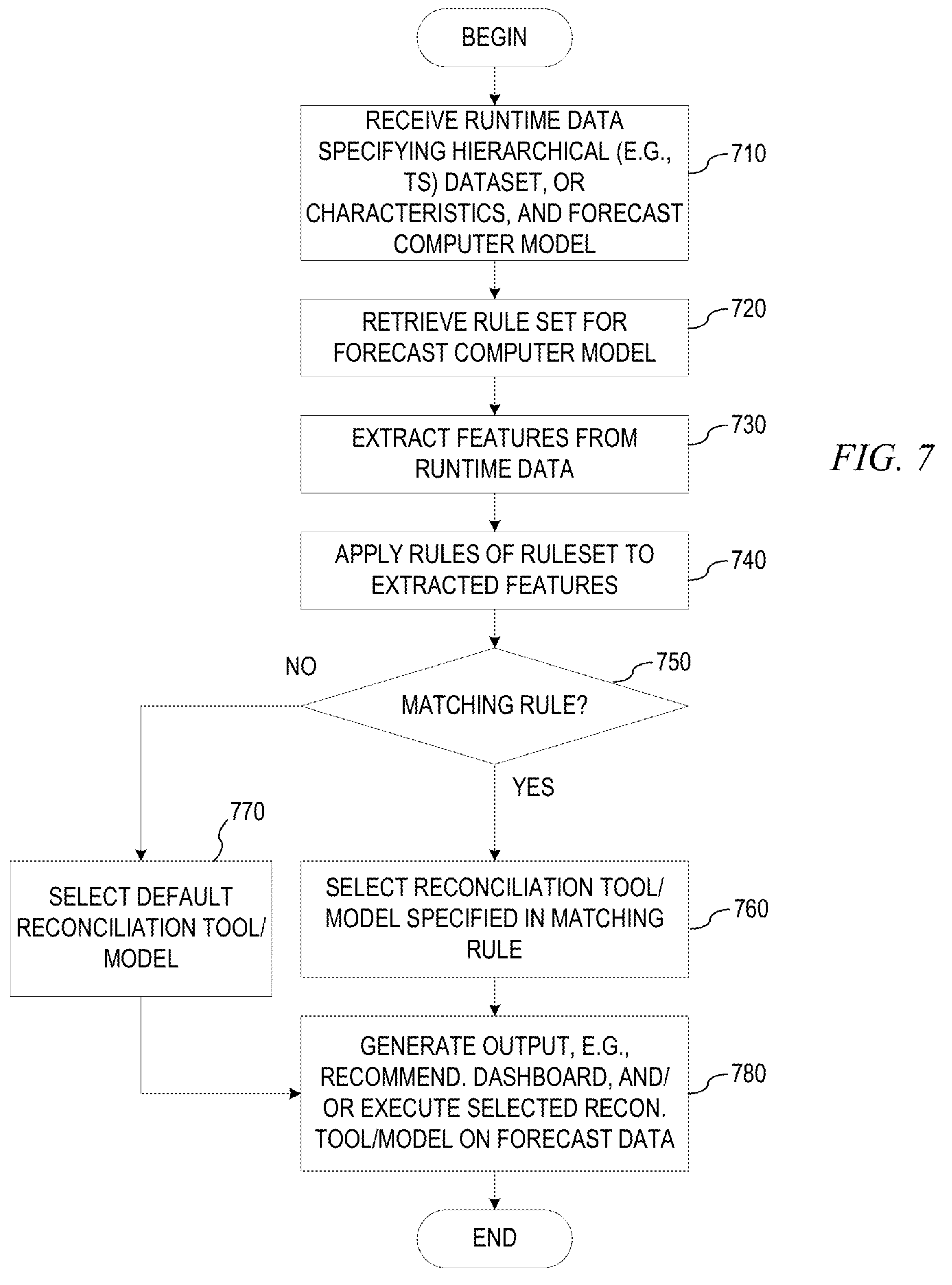
FIG. 7 is a flowchart outlining an example operation for executing an set of reconciliation computing tool selection rules for a given forecast computing model in accordance with some illustrative embodiments.

FIGS. 5-7 present flowcharts outlining example operations of elements of the present invention with regard to one or more illustrative embodiments. It should be appreciated that the operations outlined in FIGS. 5-7 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-7, and may, in some cases, make use of the results generated as a consequence of the operations set forth in FIGS. 5-7, the operations in FIGS. 5-7 themselves are specifically performed by the improved computing tool in an automated manner.

FIG. 5 is a flowchart outlining an example operation for training a machine learning computer model for reconciliation computing tool selection in accordance with some illustrative embodiments. As shown in FIG. 5, the operation starts by receiving historical data and ground truth data (step 510). Feature extraction is performed on the historical data which includes historical time series datasets, corresponding forecast computer models characteristics, and corresponding reconciliation computer tool/model characteristics, which may be retrieved from a catalog data structure or the like (step 520). The features are encoded and input to a machine learning computer model (step 530) which is then trained on the input features using a machine learning training logic, the ground truth data, and a predefined loss function minimization methodology (step 540). The machine learning computer model predicts a reconciliation (recon) computer tool/model performance for each candidate recon computer tool/model (step 550), e.g., an error between a reconciled forecast data should the reconciliation computer tool/model be applied to the forecast data for the given forecast computer model operating on the time series data, and an actual forecast data that represents a correct forecast. By attempting to minimization of the error between these two, a modification of operational parameters (step 560) of the machine learning computer model to minimize the error is performed and the process is iterated until convergence (step 570). After convergence, the trained machine learning computer model is then deployed for runtime operation (step 580). In some illustrative embodiments, the trained machine learning computer model may be executed again on the historical data to generate correlations between input features and predicted performance to thereby generate rule sets for forecast computer models (step 590) which may then be deployed (step 595) in the service or to end user computing systems. The operation then terminates.

FIG. 6 is a flowchart outlining an example operation for performing reconciliation computing tool selection and execution in accordance with some illustrative embodiments. As shown in FIG. 6, the operation starts by receiving runtime data specifying either the time series dataset or characteristics of the time series dataset, and a specific forecast computer model being utilized (step 610). In some illustrative embodiments, the runtime data may also specify a subset of reconciliation computer tools/models to be evaluated, but this is not required.

Feature extraction is performed on the runtime data and reconciliation computer tool/model characteristics, which may be retrieved from the catalog data structure (step 620). The features are encoded and input to the trained reconciliation prediction computer model(s), which may be trained through a process such as described above with regard to FIG. 5. The trained reconciliation prediction computer model(s) evaluate the input features of the time series dataset and forecast computer model and generate, for each candidate reconciliation computer tool/model being considered, a predicted performance (step 630). The predictions are used to rank the reconciliation computer tools/models relative to one another (step 640) and a reconciliation computer tool/model is selected for application to the forecast data generated by the forecast computer model on the time series dataset (step 650). An output is generated based on the selection, which may include a dashboard recommendation output or an automatic execution of the selected reconciliation computer tool/model (step 660). The operation then terminates.

FIG. 7 is a flowchart outlining an example operation for executing a set of reconciliation computing tool selection rules for a given forecast computing model in accordance with some illustrative embodiments. As shown in FIG. 7, the operation starts by receiving runtime data specifying a hierarchical dataset, e.g., time series dataset, or the dataset's characteristics from which feature extraction can be performed, along with a specification of a forecast computer model being used (step 710). A rule set for the specified forecast computer model is retrieved (step 720) and features are extracted from the runtime data, which may be similar features that are extracted from the historical data when performing training of the machine learning computer model as described in FIG. 5, for example (step 730). The rules of the retrieved rule set are applied to the extracted features to determine which, if any, rules have criteria satisfied by the extracted features, i.e., which rules are matched (step 740).

A determination is made as to whether a matching rule is found (step 750). If a matching rule is found, the reconciliation computer tool/model specified in the matched rule is selected (step 760). If a matching rule is not found, then a default reconciliation computer tool/model may be selected (step 770). The selected reconciliation computer tool/model is then used as a basis for generating an output (step 780). The output may be a dashboard output specifying a recommendation of a reconciliation computer tool/model for use with the forecast computer model and time series dataset. The output may be an automated execution of the selected reconciliation computer tool/model on forecast data generated by the forecast computer model executed on the time series dataset. The operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides automated reconciliation computer tool/model performance predictions, ranking, and selection taking into consideration the features of a hierarchical dataset, features of the reconciliation computer tool/model, and features of the forecast computer model. The improved computing tool implements mechanism and functionality, such as the reconciliation computing tool/model recommendation engine 400 in FIG. 4, which cannot be practically performed by human beings either outside of, or with the assistance of, a technical environment, such as a mental process or the like. The improved computing tool provides a practical application of the methodology at least in that the improved computing tool is able to provide intelligent artificial intelligence based performance prediction of reconciliation computer tools/models and ultimately ranking and selection of a reconciliation computer tool/model from a large set of candidates while avoiding accuracy issues of static selection of a reconciliation computer tool/model and avoiding brute force methods of executing a plurality of reconciliation computer tools/models on the hierarchical data and determining after the fact which provides a highest accuracy result.

Figure 8:
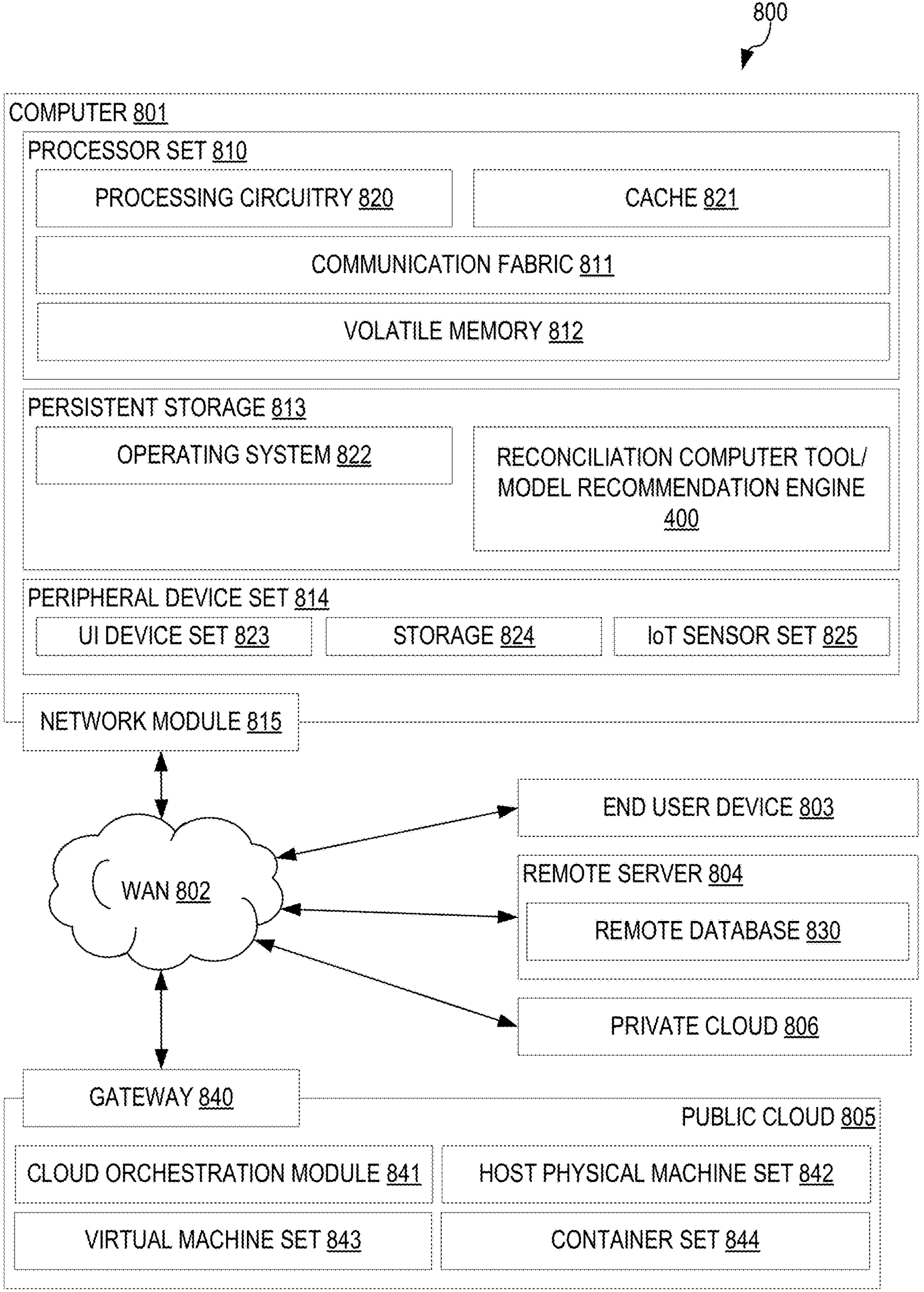
FIG. 8 is an example diagram of a distributed data processing system environment in which aspects of the illustrative embodiments may be implemented and at least some of the computer code involved in performing the inventive methods may be executed.

FIG. 8 is an example diagram of a distributed data processing system environment in which aspects of the illustrative embodiments may be implemented and at least some of the computer code involved in performing the inventive methods may be executed. That is, computing environment 800 contains an example of an environment for the execution of at least some of the computer code involved in performing the inventive methods, such as the recon recommendation engine 400 in FIG. 4, for example. In addition to block 400, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 400, as identified above), peripheral device set 814 (including user interface (UI), device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 200 in persistent storage 813.

Communication fabric 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 200 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

As shown in FIG. 8, one or more of the computing devices, e.g., computer 801 or remote server 804, may be specifically configured to implement a reconciliation computing tool/model recommendation engine 400. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 801 or remote server 804, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates accurate reconciliation of forecast data across the levels of a hierarchical dataset without incurring the resource costs of a brute force methodology or the inaccuracies of a static selection of a reconciliation computer tool/model.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic identification of a reconciliation computer tool for producing coherent reconciled data from base data generated by a computer model, the method comprising:

executing a machine learning training operation on at least one performance prediction computer model, based on first input features of at least one hierarchical dataset, and second input features of a plurality of different reconciliation computer tools, wherein the at least one performance prediction computer model generates a prediction of performance of a corresponding reconciliation computer tool based on the first input features and second input features, and wherein operational parameters of the at least one performance prediction computer model are iteratively modified based at least in part on the prediction of performance to generate a trained at least one performance prediction computer model;

extracting features of a runtime hierarchical dataset;

inputting the extracted features of the runtime hierarchical dataset into the trained at least one performance prediction computer model;

generating, by the trained at least one performance prediction computer model, predictions of performance of a plurality of reconciliation computer tools based on the extracted features of the runtime hierarchical dataset;

ranking the plurality of reconciliation computer tools relative to one another based on the predictions of performance;

generating one or more rules that correlate the extracted features of the runtime hierarchical dataset with the plurality of reconciliation computer tools based on ranking of the plurality of reconciliation computer tools; and generating an output based on the ranking of the reconciliation computer tools and the one or more rules, wherein the reconciliation computer tools are computing tools that reconcile data across a plurality of levels of a hierarchy of a given hierarchical dataset.

2. The computer-implemented method of claim 1, wherein the at least one hierarchical dataset and the runtime hierarchical dataset are time series forecast datasets that forecast data for future times in a time series.

3. The computer-implemented method of claim 2, wherein the first input features of the at least one hierarchical dataset and the extracted features of the runtime hierarchical dataset comprise at least one of a seasonality of the time series forecast datasets, domain and metadata features, noise across the hierarchy of the time series forcast datasets, noise across time, or trend/stationarity of the data in the time series forecast datasets.

4. The computer-implemented method of claim 1, wherein the first input features are a vector representation of characteristics of the at least one hierarchical dataset generated by a representation computer model, and wherein the extracted features of the runtime hierarchical dataset are a vector representation of characteristics of the runtime hierarchical dataset generated by the representation computer model.

5. The computer-implemented method of claim 1, wherein there are a plurality of performance prediction computer models trained through the machine learning training operation, and wherein each performance prediction computer model is associated with a different reconciliation computer tool in the plurality of reconciliation computer tools.

6. The computer-implemented method of claim 1, further comprises:

generating the second input features based at least in part on an encoding method used by a corresponding reconciliation computer tool and additional parameter encoding method of the corresponding reconciliation computer tool.

7. The computer-implemented method of claim 1, wherein ranking the reconciliation computer tools relative to one another based on the predictions of performance comprises generating a score for each reconciliation computer tool based on a corresponding prediction of performance, a corresponding determination of computing resource requirements for the reconciliation computer tool, and a storage requirement for the reconciliation computer tool, and ranking the reconciliation computer tools based on their scores.

8. The computer-implemented method of claim 1, wherein the output is a dashboard user interface that presents one or more views of data generated by the trained at least one performance prediction computer model used to rank the reconciliation computer tools relative to one another and a basis for the ranking of the reconciliation computer tools.

9. The computer-implemented method of claim 1, wherein generating the output further comprises:

automatically selecting a reconciliation computer tool based on the ranking of the reconciliation computer tools relative to one another to apply to the runtime hierarchical dataset; and executing the selected reconciliation computer tool on the runtime hierarchical dataset.

10. The computer-implemented method of claim 1, wherein the runtime hierarchical dataset is a time series dataset of a sequence of observations or measurements obtained over time.

11. The computer-implemented method of claim 1, wherein the one or more rules indicate selecting a dynamic reconciliation computing model based on a determination that the runtime hierarchical dataset demonstrates non-stationarity.

12. The computer-implemented method of claim 1, wherein the one or more rules indicate selecting a bottom-up reconciliation computing model based on a determination that higher levels of the runtime hierarchical dataset demonstrates noisiness.

13. A non-transitory computer-readable medium storing a set of instructions for wireless communication, the set of instructions comprising:

one or more instructions that, when executed by one or more processors of a device, cause the device to:

execute a machine learning training operation on at least one performance prediction computer model, based on first input features of at least one hierarchical dataset, and second input features of a plurality of different reconciliation computer tools, wherein the at least one performance prediction computer model generates a prediction of performance of a corresponding reconciliation computer tool based on the first input features and second input features, and wherein operational parameters of the at least one performance prediction computer model are iteratively modified based at least in part on the prediction of performance to generate a trained at least one performance prediction computer model;

extract features of a runtime hierarchical dataset;

input the extracted features of the runtime hierarchical dataset into the trained at least one performance prediction computer model;

generate, by the trained at least one performance prediction computer model, predictions of performance of a plurality of reconciliation computer tools based on the extracted features of the runtime hierarchical dataset;

rank the plurality of reconciliation computer tools relative to one another based on the predictions of performance;

generate one or more rules that correlate the extracted features of the runtime hierarchical dataset with the plurality of reconciliation computer tools based on ranking of the plurality of reconciliation computer tools; and generate an output based on the ranking of the reconciliation computer tools and the one or more rules, wherein the reconciliation computer tools are computing tools that reconcile data across a plurality of levels of a hierarchy of a given hierarchical dataset.

14. The non-transitory computer-readable medium of claim 13, wherein the at least one hierarchical dataset and the runtime hierarchical dataset are time series forecast datasets that forecast data for future times in a time series.

15. The non-transitory computer-readable medium of claim 14, wherein the first input features of the at least one hierarchical dataset and the extracted features of the runtime hierarchical dataset comprise at least one of a seasonality of the time series forecast datasets, domain and metadata features, noise across the hierarchy of the time series forecast datasets, noise across time, or trend/stationarity of the data in the time series forecast datasets.

16. The non-transitory computer-readable medium of claim 13, wherein the first input features are a vector representation of characteristics of the at least one hierarchical dataset generated by a representation computer model, and wherein the extracted features of the runtime hierarchical dataset are a vector representation of characteristics of the runtime hierarchical dataset generated by the representation computer model.

17. The non-transitory computer-readable medium of claim 13, wherein there are a plurality of performance prediction computer models trained through the machine learning training operation, and wherein each performance prediction computer model is associated with a different reconciliation computer tool in the plurality of reconciliation computer tools.

18. The non-transitory computer-readable medium of claim 13, wherein the one or more instructions cause the device to:

generate second input features based at least in part on an encoding method used by a corresponding reconciliation computer tool and additional parameter encoding method of the corresponding reconciliation computer tool.

19. The non-transitory computer-readable medium of claim 13, wherein ranking the reconciliation computer tools relative to one another based on the predictions of performance comprises generating a score for each reconciliation computer tool based on a corresponding prediction of performance, a corresponding determination of computing resource requirements for the reconciliation computer tool, and a storage requirement for the reconciliation computer tool, and ranking the reconciliation computer tools based on their scores.

20. An apparatus comprising:

one or more processors; and one or more memory devices coupled to the one or more processors, wherein the one or more processors are configured to: execute a machine learning training operation on at least one performance prediction computer model, based on first input features of at least one hierarchical dataset, and second input features of a plurality of different reconciliation computer tools, wherein the at least one performance prediction computer model generates a prediction of performance of a corresponding reconciliation computer tool based on the first input features and second input features, and wherein operational parameters of the at least one performance prediction computer model are iteratively modified based at least in part on the prediction of performance to generate a trained at least one performance prediction computer model;

extract features of a runtime hierarchical dataset;

input the extracted features of the runtime hierarchical dataset into the trained at least one performance prediction computer model;

generate, by the trained at least one performance prediction computer model, predictions of performance of a plurality of reconciliation computer tools based on the extracted features of the runtime hierarchical dataset;

rank the plurality of reconciliation computer tools relative to one another based on the predictions of performance;

generate one or more rules that correlate the extracted features of the runtime hierarchical dataset with the plurality of reconciliation computer tools based on ranking of the plurality of reconciliation computer tools; and generate an output based on the ranking of the reconciliation computer tools and the one or more rules, wherein the reconciliation computer tools are computing tools that reconcile data across a plurality of levels of a hierarchy of a given hierarchical dataset.

* * * * *